United States Patent
Kim et al.

(10) Patent No.: US 11,820,665 B2
(45) Date of Patent: Nov. 21, 2023

(54) HIGH-PRESSURE HOMOGENIZER AND METHOD FOR MANUFACTURING GRAPHENE USING THE SAME

(71) Applicant: LG Chem, Ltd., Seoul (KR)

(72) Inventors: Eun Jeong Kim, Daejeon (KR); Kwang Hyun Yoo, Daejeon (KR); Ye Hoon Im, Daejeon (KR); In Young Kim, Daejeon (KR); Won Jong Kwon, Daejeon (KR)

(73) Assignee: LG Chem, Ltd.

( * ) Notice: Subject to any disclaimer, the term of this patent is extended or adjusted under 35 U.S.C. 154(b) by 73 days.

(21) Appl. No.: 17/569,794

(22) Filed: Jan. 6, 2022

(65) Prior Publication Data

US 2022/0144643 A1 May 12, 2022

Related U.S. Application Data

(62) Division of application No. 16/343,059, filed as application No. PCT/KR2017/011278 on Oct. 13, 2017, now Pat. No. 11,242,251.

(30) Foreign Application Priority Data

Oct. 18, 2016  (KR) .......................... 10-2016-0134895

(51) Int. Cl.
*C01B 32/00* (2017.01)
*C01B 32/19* (2017.01)
(Continued)

(52) U.S. Cl.
CPC ........ *C01B 32/19* (2017.08); *B01F 25/44121* (2022.01); *B01F 33/30* (2022.01);
(Continued)

(58) Field of Classification Search
CPC ..................................................... B01J 19/006
See application file for complete search history.

(56) References Cited

U.S. PATENT DOCUMENTS

2005/0239910 A1  10/2005  Jarosch et al.
2006/0051265 A1  3/2006  Mohamed et al.
(Continued)

FOREIGN PATENT DOCUMENTS

DE    1168869 B    4/1964
JP    S6227662 A   2/1987
(Continued)

OTHER PUBLICATIONS

JP2007050340 to Itakura Machine Translation (Year: 2007).*
(Continued)

*Primary Examiner* — Anshu Bhatia
(74) *Attorney, Agent, or Firm* — Lerner David LLP

(57) ABSTRACT

Provided a high-pressure homogenizer comprising a channel module comprising a microchannel through which an object for homogenization passes, wherein the microchannel is provided with a first flow channel and a second flow channel sequentially arranged along the direction through which the object passes, the first flow channel is provided with a plurality of first baffles disposed so as to partition the microchannel into a plurality of spaces, the second flow channel is provided with a plurality of second baffles disposed so as to partition the microchannel into a plurality of spaces, and at least one of the first baffles is provided to be positioned between two adjacent second baffles.

13 Claims, 6 Drawing Sheets

(51) Int. Cl.
  *B01J 19/00*    (2006.01)
  *B01F 25/441*   (2022.01)
  *B01F 33/30*    (2022.01)
  *B01F 25/51*    (2022.01)

(52) U.S. Cl.
  CPC ......... *B01J 19/006* (2013.01); *B01J 19/0093* (2013.01); *B01F 25/51* (2022.01); *B01J 2219/0086* (2013.01); *B01J 2219/00765* (2013.01); *B01J 2219/00889* (2013.01)

(56) References Cited

U.S. PATENT DOCUMENTS

| | | |
|---|---|---|
| 2009/0092526 A1 | 4/2009 | Miller |
| 2009/0142237 A1 | 6/2009 | Seo et al. |
| 2017/0166449 A1 | 6/2017 | Yoo et al. |

FOREIGN PATENT DOCUMENTS

| | | | |
|---|---|---|---|
| JP | 2788010 | B2 | 8/1998 |
| JP | 2007050340 | * | 3/2007 |
| JP | 2007050340 | A | 3/2007 |
| JP | 2008229555 | A | 10/2008 |
| JP | 2009208052 | A | 9/2009 |
| JP | 2012096233 | A | 5/2012 |
| KR | 101043895 | B1 | 6/2011 |
| KR | 20120096277 | A | 8/2012 |
| KR | 101499530 | B1 | 3/2015 |
| KR | 20160069866 | A | 6/2016 |

OTHER PUBLICATIONS

Search report from International Application No. PCT/KR2017/011278, dated Feb. 19, 2018.

Extended European Search Report including Written Opinion for Application No. EP17861486.3 dated Sep. 27, 2019, pp. 1-8.

* cited by examiner

[Figure 1]
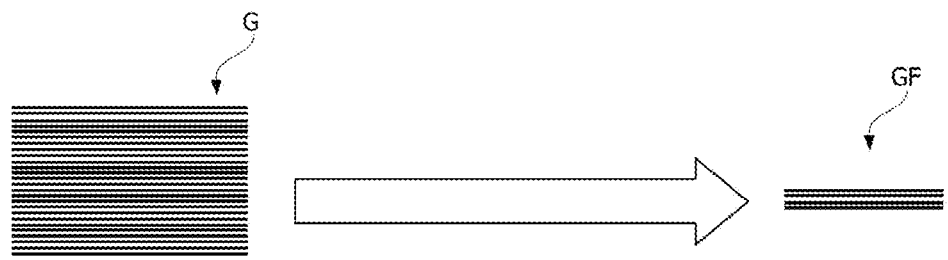

[Figure 2]
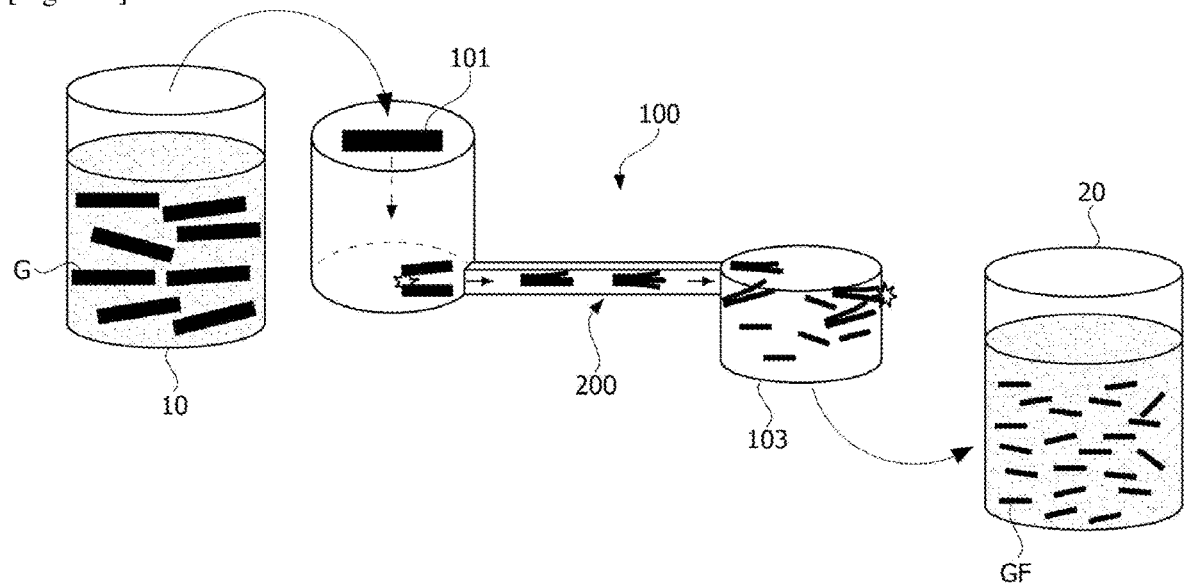

[Figure 3]
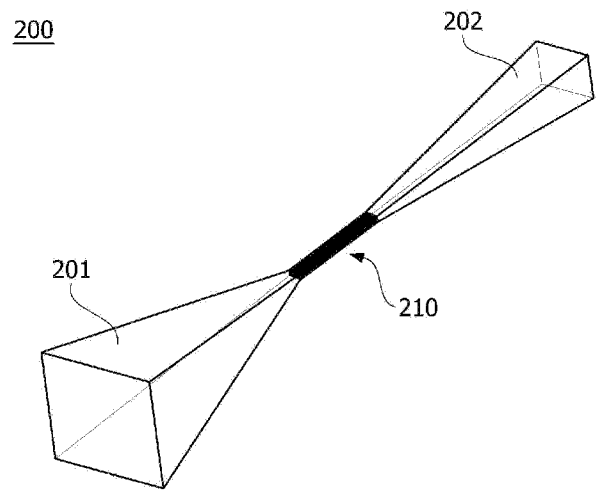
[Figure 4]
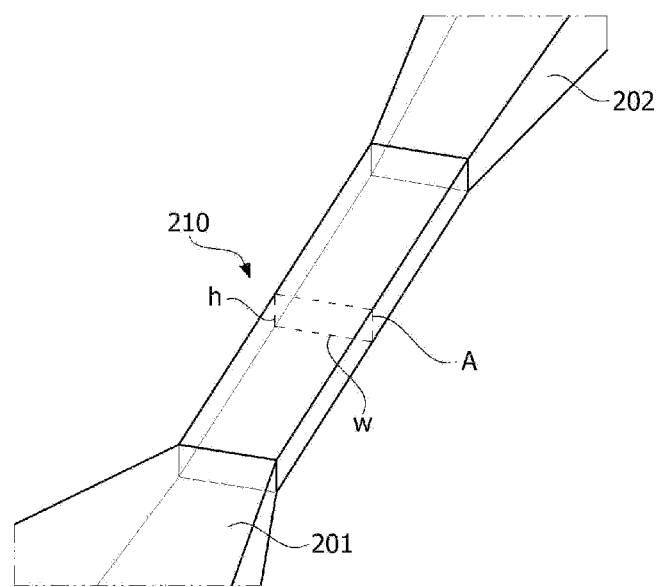

[Figure 5]
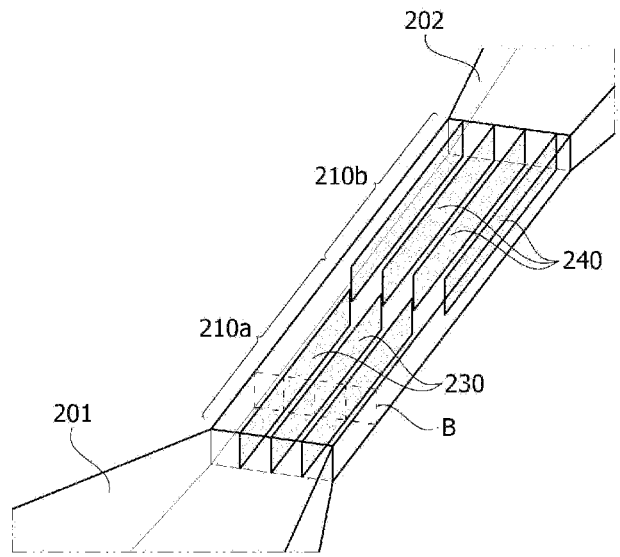
[Figure 6]
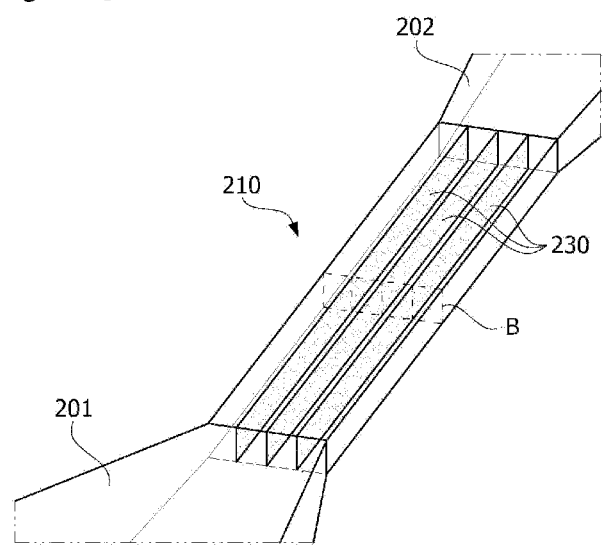

[Figure 7]
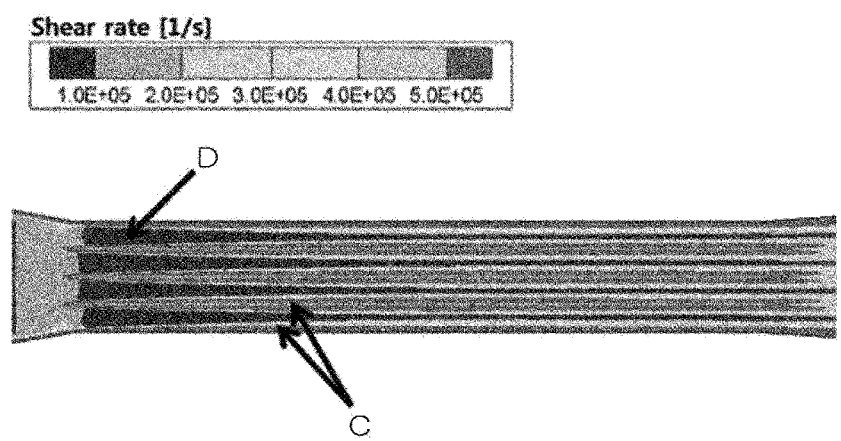
[Figure 8]
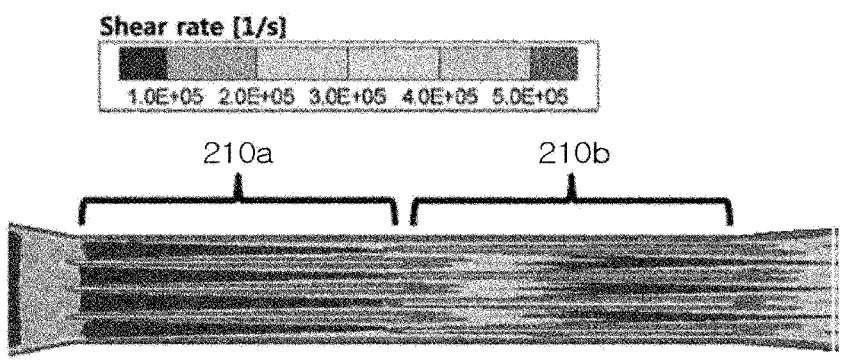

[Figure 9]
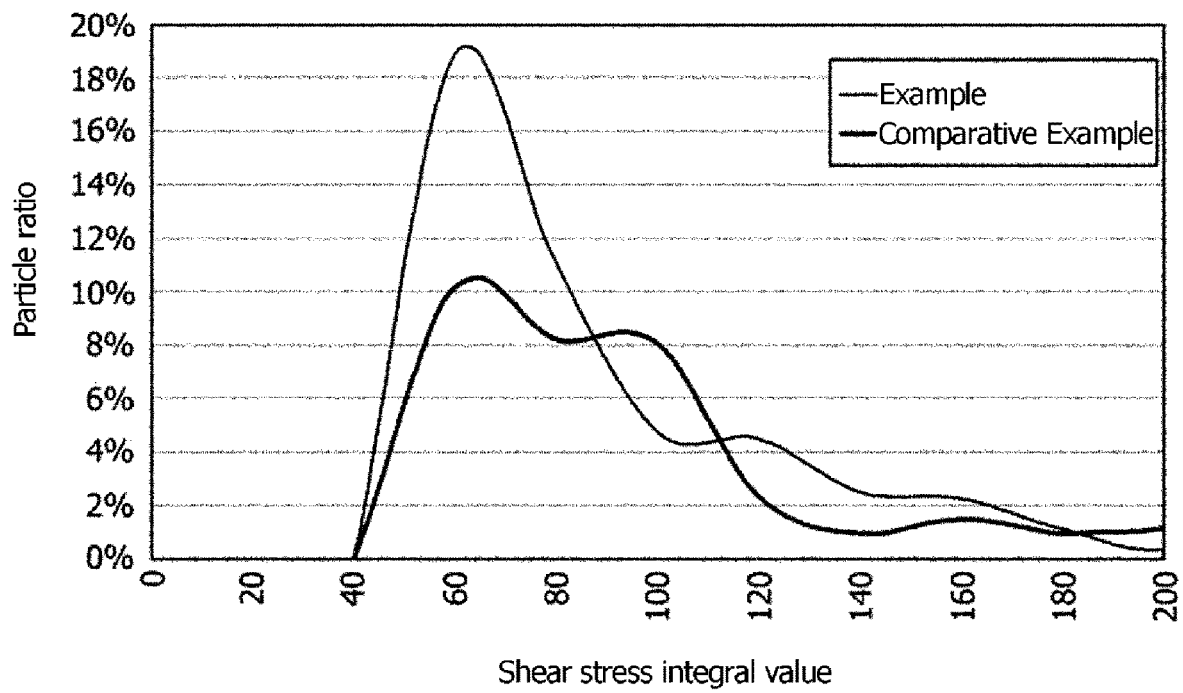

HIGH-PRESSURE HOMOGENIZER AND METHOD FOR MANUFACTURING GRAPHENE USING THE SAME

CROSS-REFERENCE TO RELATED APPLICATIONS

This application is a divisional of U.S. application Ser. No. 16/343,059 filed on Apr. 18, 2019, which is a national phase entry under 35 U.S.C. § 371 of International Application No. PCT/KR2017/011278 filed on Oct. 13, 2017, which claims priority from Korean Application No. 10-2016-0134895 filed on Oct. 18, 2016, all of which are incorporated herein by reference.

TECHNICAL FIELD

The present invention relates to a high-pressure homogenizer and a method for manufacturing graphene using the same.

BACKGROUND ART

Graphene is a metalloid material with a thickness corresponding to a carbon atomic layer while forming a hexagonally connected arrangement of carbon atoms by sp2 bonds in two dimensions. Recently, a graphene sheet having one carbon atom layer has been reported to have very good electrical conductivity.

Due to the excellent properties of graphene, various methods have been proposed or studied to more effectively mass-produce graphene from carbon-based materials such as graphite. In particular, various studies have been made on a method for easily manufacturing graphene sheets or flakes having a thinner thickness and a larger area.

FIG. 1 is a conceptual diagram for explaining a process of producing graphene flakes (GF) (or graphene) through graphite (G).

A high-pressure homogenizer (HPH) used as a method for producing graphene is a device in which a high pressure is applied to a microchannel having a micrometer scale diameter and thus a strong shear force is applied to a passing substance. Particularly, when graphite is exfoliated using the high-pressure homogenizer, there is an advantage that a graphene production yield can be increased.

Specifically, when a high-pressure homogenizer is used, the graphene is produced as graphite is exfoliated by a shear stress applied to the graphite while a graphite dispersion liquid propelled by ultra-high pressure passes through the microchannel. At this time, the graphite has a thickness of approximately several hundred nanometers, and the graphene has a thickness of approximately 2 to 30 nm.

On the other hand, for exfoliation of graphene, it is important to form a proper flow field in the microchannel so as to generate a shear stress at a level capable of breaking an interlayer bonding force. In the graphene exfoliation process using the high-pressure homogenizer, the velocity gradient is increased near the wall surface inside the microchannel due to the adhesion condition of the wall surface, so that a large shear stress is generated. However, since the velocity gradient is small at the central portion to show a small shear stress, which is lower than the critical shear stress required for exfoliation, there is a problem that the exfoliation is not performed.

DISCLOSURE

Technical Problem

It is a problem to be solved by the present invention to provide a high-pressure homogenizer capable of increasing an exfoliation effective region within a microchannel and a method for manufacturing graphene using the same.

Also, it is another problem to be solved by the present invention to provide a high-pressure homogenizer capable of uniformizing the magnitude of a shear stress that graphene particles passing through a microchannel receive, and a method of manufacturing graphene using the same.

Technical Solution

To solve the above-described problems, according to one aspect of the present invention, there is provided a high-pressure homogenizer comprising a channel module which comprises a microchannel through which an object for homogenization passes.

Here, the microchannel is provided with a first flow channel and a second flow channel sequentially arranged along the direction through which the object passes.

Also, the first flow channel is provided with a plurality of first baffles disposed so as to partition the microchannel into a plurality of spaces.

Furthermore, the second flow channel is provided with a plurality of second baffles arranged so as to partition the microchannel into a plurality of spaces.

In addition, at least one first baffle is provided so as to be positioned between two adjacent second baffles.

According to still another aspect of the present invention, there is also provided a high-pressure homogenizer comprising a channel module comprising a microchannel through which an object for homogenization passes, wherein the microchannel is provided with a first channel to an Nth channel (N>2, N is a natural number) sequentially arranged along the direction through the object passes, the channel module comprises an inflow channel in which the object is supplied to the microchannel and an outflow channel to which the object passing through the microchannel is introduced, the first flow channel is provided with a plurality of first baffles arranged so as to be partitioned into a plurality of spaces along a width direction or a height direction and sequentially, the Nth flow channel comprises a plurality of Nth baffles arranged so as to be partitioned into a plurality of spaces along a width direction or a height direction, and in two adjacent regions among N regions of the microchannel, the baffles provided in the respective regions are arranged in a staggered state for each region based on the flow cross section of the microchannel.

According to another aspect of the present invention, there is provided a method for manufacturing graphene using the high-pressure homogenizer, comprising steps of supplying a solution containing graphite to the channel module and applying a pressure of 100 to 3000 bar to the channel module to pass the solution containing graphite.

Advantageous Effects

As described above, the high-pressure homogenizer related to at least one embodiment of the present invention and the method for manufacturing graphene using the same have the following effects.

According to the present invention, in the process of exfoliating a graphene monolayer from graphite using the high-pressure homogenizer, the exfoliation effective region in the microchannel can be increased to improve productivity.

Specifically, one or more baffles are disposed in the microchannel in order to increase the region to which a shear stress (shear rate) above the critical shear stress (for example, $10^5$ 1/s) required for graphene exfoliation is applied. By partitioning the inside of the microchannel by the baffle, the wall area can be increased and the exfoliation effective region showing large shear stress can be increased.

Also, the exfoliation effective region can be increased by arranging the plurality of first baffles in the first flow channel of the microchannel at predetermined intervals along the width direction or the height direction, the exfoliation effective region can be increased by arranging the plurality of second baffles in the second flow channel at predetermined intervals along the width direction or the height direction and the magnitude of the shear stress that the graphene particles passing through the microchannel receive can be uniformly maintained by arranging the plurality of first baffles and the plurality of second baffles in a staggered state.

BRIEF DESCRIPTION OF DRAWINGS

FIG. 1 is a conceptual diagram for explaining the process of producing graphene flakes through graphite.

FIG. 2 is a conceptual diagram showing a high-pressure homogenizer related to the present invention.

FIGS. 3 to 5 are perspective views showing a channel module of a high-pressure homogenizer related to one example of the present invention.

FIG. 6 is a perspective view showing a high-pressure homogenizer related to Comparative Example.

FIG. 7 shows a simulation result using the high-pressure homogenizer shown in FIG. 6.

FIG. 8 shows a simulation result using the high-pressure homogenizer shown in FIG. 5, respectively.

FIG. 9 is a graph for explaining the effect of the present invention.

MODE FOR INVENTION

Hereinafter, a high-pressure homogenizer according to one embodiment of the present invention and a method for manufacturing graphene using the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 2 is a conceptual diagram showing a high-pressure homogenizer (100) related to one example of the present invention, and FIGS. 3 to 5 are perspective views showing a channel module (200) of a high-pressure homogenizer related to one example of the present invention.

Referring to FIGS. 2 and 3, the high-pressure homogenizer (100) means a device in which a high pressure is applied to a microchannel (210) having a micrometer scale diameter and thus a strong shear force is applied to a substance (graphite dispersion liquid) passing therethrough. The shear stress is used to perform fragmentation and dispersion to the substance passing through the microchannel (210) and to produce a highly dispersed material.

On the other hand, since the high-pressure homogenizer (100) is designed and manufactured for fragmentation and pulverization of substances through the strong shear stress, generally a very short microchannel is used. However, depending on the purpose of use of the high-pressure homogenizer (100), a microchannel having a short length may serve as a disadvantage.

Particularly, in the case of manufacturing graphene by exfoliating graphite (G) with a high-pressure homogenizer (100), like the present invention, when the microchannel having a short length is used, there is a problem that the productivity is lowered because the number of times of passage of the microchannel must be increased in order to produce thin and uniform graphene. Besides, if the length of the microchannel is short, the velocity of the fluid passing through the microchannel becomes fast, and the energy that a fluid collides with the wall surface of an outflow part (103) becomes high. Due to such a collision, there is a problem that the size of the graphene to be produced decreases because the graphene itself is pulverized. Therefore, the present invention provides a high-pressure homogenizer capable of reducing the number of times of passage of the microchannel without pulverizing the graphene itself within a range where the shear stress required for graphite exfoliation is applied.

Referring to FIG. 2, the high-pressure homogenizer (100) comprises a channel module (200) comprising a microchannel through which an object for homogenization passes. The object is the above-mentioned graphite (G). The high-pressure homogenizer (100) comprises an inflow part (101) through which the object is supplied toward the channel module (200) and an outflow part (103) through which the object passing through the channel module (200) flows out. In FIG. 2, a reference numeral (10) denotes a container containing a graphite (G) dispersion liquid, and a reference numeral (20) denotes a container containing graphene (GF) recovered from the outflow part (103). In addition, the high-pressure homogenizer (100) comprises a pump for generating a pressure for pressing the object to pass through the channel module (200). While the object passes through the microchannel (210) with the pressure generated by the pump, homogenization is achieved.

On the other hand, referring to FIG. 3, the channel module (200) comprises an inflow channel (201) in which an object is supplied to the microchannel (210) and an outflow channel (202) from which the object passing through the microchannel (201) is discharged. At this time, the inflow channel (201) is provided so that at least a part of the flow area becomes small along the moving direction of the object, and the outflow channel (202) is provided such that at least a part of the flow area increases along the moving direction of the object. In addition, the microchannel (210) may be provided to have a constant flow area (sectional area) along the moving direction of the object.

In the present invention, the object is graphite (G), which is exfoliated by a strong shear stress (shear rate) in the microchannel (210) to produce graphene (GF). At this time, it is preferred for the length of the microchannel to be 2 mm to 1000 mm, in order for the shear force required for graphite exfoliation is applied, and at the same time, the section where the shear force is applied is lengthened, while the energy that the fluid passing through the microchannel (210) collides with the wall surface of the outflow part (103) is reduced, so that the graphene itself is not pulverized. More preferably, the length of the microchannel may be in 2 mm to 60 mm.

As a result of analyzing the flow inside the high-pressure homogenizer (100) through the flow field simulation, it has been confirmed that the energy consumption shown in the high-pressure homogenizer is partitioned into energy losses at the microchannel inlet (secondary loss), the microchannel interior (intuition loss) and the microchannel outlet (secondary loss). Specifically, it has been confirmed that the energy consumption is large while the flow area (channel sectional area) changes at the microchannel inlet (first flow channel side) and the microchannel outlet (second flow channel side), and the energy consumption inside the microchannel is within about 5% of the entire energy consumption. Based on this, it has been confirmed that even if the length of the microchannel (210) is increased, the resulting decrease of the energy consumption and the flow rate is insignificant and the shear stress required for graphene exfoliation is applied over the entire length of the microchannel (210).

Also, it has been confirmed that the case where the length of the microchannel (210) is 30 mm or more has the same effect as the case where the graphene exfoliation process is repeated 15 times in the high-pressure homogenizer having a length in the microchannel (210) of 2 mm. Therefore, by increasing the length of the microchannel (210), it is possible to reduce the number of microchannel passage times, thereby increasing the productivity.

The microchannel (210) may have a cross section (A) (channel cross section), which is perpendicular to the moving direction of the object for homogenization, of a rectangular shape. Also, the microchannel (210) may have a cross section of a rectangular shape in which a width (w) is greater than a height (h). In addition, the microchannel (210) has preferably a ratio between width and height of 2:1 or more, and particularly, the microchannel (210) may be formed to have a ratio between width and height of 2:1 to 10:1. Furthermore, the width and breadth of the rectangle may be 10 μm to 50000 μm, respectively. In the conventional high-pressure homogenizer, the cross section of the microchannel is circular, but in the present invention, the rectangular shape having a larger surface area than the circular shape is used, whereby the sectional area of the flow channel can be increased. Also, the microchannel may have a sectional area of $1.0 \times 10^2$ μm$^2$ to $1.0 \times 10^8$ μm$^2$.

In the method for manufacturing graphene using the high-pressure homogenizer (100), the method for manufacturing graphene also comprises a step of supplying a solution containing graphite (G) to the channel module (200) and a step of applying pressure to the channel module (200) to pass the solution containing the graphite (G). The pressure may be in 100 to 3000 bar. In addition, the graphene (GF) dispersion liquid can be recovered from the outflow part (103) and then again reintroduced into the inflow part (101). The reintroduction process may be repeated 2 to 30 times. The reintroduction process may also be repeated using a single high-pressure homogenizer or using a plurality of high-pressure homogenizers sequentially.

In addition, the method for manufacturing graphene may comprise a step of recovering and drying the graphene from the recovered graphene (GF) dispersion liquid. The recovering step may be carried out by centrifugation, filtration under reduced pressure or pressure filtration. The drying step may be performed by vacuum drying or general drying under a temperature of about 30 to 200° C. Furthermore, the graphene produced according to the present invention has an advantage that is advantageous in expressing characteristics inherent to graphene, since its size is large and uniform.

Referring to FIG. 5, in this example, the high-pressure homogenizer (100) comprises a channel module (200) comprising a microchannel (210) through which an object for homogenization passes. In the microchannel (210), a first flow channel (210a) and a second flow channel (210b) are provided sequentially along the direction in which the object passes. At this time, the microchannel can keep the flow area (sectional area) constant along the moving direction of the object, and the flow sectional areas of the first flow channel (210a) and the second flow channel (210b) can be kept constant along the moving direction of the object.

Also, the first flow channel (210a) may be a front end flow channel corresponding to the front end portion of the channel module (200) along the outflow direction of the object and the second flow channel (210b) may a front end flow channel corresponding to the rear end portion of the channel module (200). Furthermore, the first flow channel (210a) may be a flow channel that is relatively closer to the front end portion of the channel module (200) than the second flow channel (210b) along the outflow direction of the object, and the second flow channel (210b) may be a flow channel that is relatively closer to the rear end portion of the channel module (200) than the first flow channel (210a). In addition, the first flow channel (210a) and the second flow channel (210b) may also be referred to as two regions that are adjacent to each other and are positioned continuously, and the first flow channel (210a) and the second flow channel (210b) may also be referred to as two regions positioned apart at a predetermined interval.

The first flow channel (210a) is provided with a plurality of first baffles (230) disposed so as to partition the microchannel (210) into a plurality of spaces. The second flow channel (210b) is provided with a plurality of second baffles (240) disposed to partition the microchannel (210) into a plurality of spaces.

At this time, the plurality of first baffles (230) may be arranged along the width direction or height direction of the microchannel. Similarly, the plurality of second baffles (240) may be arranged along the width direction or height direction of the microchannel.

For example, when the pluralities of first baffles (230) are arranged along the width direction of the microchannel, the pluralities of second baffles (240) may be arranged along the width direction of the microchannel. Alternatively, when the pluralities of first baffles (230) are arranged along the width direction of the microchannel, the pluralities of second baffles (240) may be arranged along the height direction of the microchannel. Alternatively, when the pluralities of first baffles (230) are arranged along the height direction of the microchannel, the pluralities of second baffles (240) may be arranged along the height direction of the microchannel. Alternatively, when the pluralities of first baffles (230) are arranged along the height direction of the microchannel, the pluralities of second baffles (240) may be arranged along the width direction of the microchannel.

At this time, at least one first baffle (230) is provided to be positioned between two adjacent second baffles (240). The plurality of first baffles (230) and the plurality of second baffles (240) are arranged in a staggered state based on the flow cross section of the microchannel (210). That is, at least one first baffle (230) is provided to be positioned between two adjacent second baffles (240), based on the flow cross section of the microchannel (210).

For example, when the pluralities of first baffles (230) are arranged along the width direction of the microchannel and the pluralities of second baffles (240) are arranged along the width direction of the microchannel, at least one first baffle (230) is provided to be positioned between two adjacent second baffles (240) along the width direction of the microchannel, based on the flow cross section of the microchannel (210).

Also, when the pluralities of first baffles (230) are arranged along the height direction of the microchannel and the pluralities of second baffles (240) are arranged along the height direction of the microchannel, at least one first baffle (230) is provided to be positioned between two adjacent second baffles (240) along the height direction of the microchannel, based on the flow cross section of the microchannel (210).

Furthermore, the channel module (200) comprises an inflow channel (201) in which the object is supplied to the microchannel (210), an outflow channel (202) to which the object passing through the microchannel (210) is introduced, a plurality of first baffles (230) arranged so as to partition the first flow channel (210a) into a plurality of spaces along the width direction (w) or the height direction (h) and a plurality of second baffles (240) arranged so as to partition the second flow channel (210b) into a plurality of spaces along the width direction (w) or the height direction (h).

In addition, the first and second baffles (230, 240) are provided to partition the microchannel (210) into two spaces along the width direction (w) or the height direction (h). Hereinafter, for convenience of explanation, a case where the microchannel is partitioned into a plurality of spaces along the width direction will be explained as an example. For example, the channel module (200) is provided so that object passes through the respective spaces (e.g., B) partitioned by the first and second baffles (230, 240).

The interval between two adjacent first baffles (230) may be equal to the interval between two adjacent second baffles (240). Specifically, the flow sectional area of the space partitioned by the first baffle (230) and the flow sectional area of the space partitioned by the second baffle (240) may be the same. That is, when the graphen passes through the first flow channel (210a), the flow sectional area of the partitioned space (B) may be equal to the flow sectional area of the partitioned space when passing through the second flow channel (210b). Alternatively, the interval between two adjacent first baffles (230) may be different from the interval between two adjacent second baffles (240). Specifically, the flow sectional area of the space partitioned by the first baffle (230) and the flow sectional area of the space partitioned by the second baffle (240) may be different from each other. That is, when the graphene passes through the first flow channel (210a), the flow sectional area of the partitioned space (B) may differ from that of the partitioned space when passing through the second flow channel (210b).

Also, the length of the first baffle (230) may also be the same as the length of the second baffle (240) and the length of the first baffle (230) and the length of the second baffle (240) may also be different from each other.

In addition, the critical shear stress (shear rate) required for graphene exfoliation is based on $10^5$ 1/s, and the total sectional areas of the region A in FIG. 4 and the region B in FIG. 5 are the same. However, in the region B in FIG. 5, three first baffles (230) are disposed in the microchannel (210) at equal intervals in the width direction (w), and the flow sectional area in the microchannel (210) is partitioned into four.

In order to confirm that the exfoliation effective region is increased by the first baffles (230), experiments for the region A (see FIG. 4) in which the first and second baffles were not disposed and the region B (see FIG. 5) in which the three first baffles were disposed were each performed using the same graphite dispersion flowing through the microchannel (210) under the same flow rate condition. However, in order to satisfy the same flow rate condition, the pressure (pump pressure) (about 9.3 bar) applied to the microchannel shown in FIG. 5 is larger than the pressure (about 6 bar) applied to the microchannel shown in FIG. 4.

As a result of the experiment, in the case of the region A without installing any baffle in the microchannel, it has been confirmed that the region where the shear stress (shear rate) above the critical shear stress (for example, $10^5$ 1/s) required for graphene exfoliation is applied is increased. The exfoliation effective region represents a region where shear stresses greater than the critical shear stress (shear rate, $10^5$ 1/s) are generated.

Alternatively, in the case of the region B in FIG. 5, it can be confirmed that the exfoliation effective region (blue region) increases (about 23%).

That is, if one or more baffles (230, 240) are disposed in the microchannel (210), it can be confirmed that a region where a shear stress (shear rate) above the critical shear stress (for example, $10^5$ 1/s) required for graphene exfoliation is applied is increased. By partitioning the inside of the microchannel (210) by the first and second baffles (230, 240), the wall area can be increased and the exfoliation effective region in which the large shear stress appears can be increased.

Also, the present invention has been explained based on the first baffle (230) and the second baffle (240), but the present invention is not limited thereto. For example, in the microchannel, the first flow channel and the Nth (N>2, N is a natural number) flow channel may be provided sequentially along the direction through which the object passes. That is, the microchannel can be divided into N regions along the outflow direction of the object. At this time, the first flow channel may be provided with a plurality of first baffles disposed so as to partition the microchannel into a plurality of spaces, and sequentially, the Nth flow channel may be provided with a plurality of Nth baffles disposed so as to partition the microchannel into a plurality of spaces. At this time, in two adjacent regions among N regions of the microchannel along the outflow direction of the object, the baffles provided in the respective regions may be arranged in a staggered state for each region. That is, as the graphene particles pass through the staggered baffles several times, the uniformity of graphene exfoliation becomes high.

FIG. 6 is a perspective view showing a high-pressure homogenizer related to Comparative Example.

The high-pressure homogenizer shown in FIG. 6 differs from one example of the present invention in that the high-pressure homogenizer has a structure in which the microchannel is partitioned only by the first baffles (230).

FIG. 7 shows a simulation result using the high-pressure homogenizer shown in FIG. 6, and FIG. 8 shows a simulation result using the high-pressure homogenizer shown in FIG. 5, respectively.

Also, FIG. 9 is a graph for explaining the effect of the present invention.

Referring to the simulation results of FIGS. 7 and 8, in each channel module, the microchannel (210) has a length of 2 mm, a width of 320 μm and a height of 100 μm.

Referring to FIG. 7, which is simulated using Comparative Example shown in FIG. 6, Symbol C represents a vicinity of the wall where a large shear stress appears, and Symbol D represents the central part of the flow channel (central part between the wall surface and the wall surface) having a low shear stress. Based on the flow sectional area, Part D corresponds to the central part.

Alternatively, referring to FIG. 8, the microchannel (210) is divided into the first flow channel (210a) and the second flow channel (210b) and the plurality of first baffles (230) and the plurality of second baffles (240) are arranged in a staggered state, so that the flow of the graphene particles flowing in the flow channel central part having the low shear stress in the first flow channel (210a) flows near the wall having a high shear stress in the second flow channel (210b). It can also be confirmed that the flow of the graphene particles flowing near the wall having the high shear stress in the first flow channel (210a) flows to the flow channel central part having the low shear stress in the second flow channel (210b).

Thus, as the level of shear stress (exfoliation level) received by the graphene particles over the first flow channel (210a) and the second flow channel (210b) becomes uniform, the graphene thickness deviation is reduced. Specifically, the thickness (exfoliation degree) of the graphene is determined by how much shear stress the graphite particles receive in the microchannel (210). In addition, as the shear stress that the graphene particles receive in the microchannel (210) is uniformized, the graphene thickness deviation is reduced.

Also, shear stress integral values can be used to quantitatively compare the shear stresses that graphene particles receive in microchannel. The shear stress integral value is a value obtained by integrating the shear stresses received by the fluid particles along the movement path of the fluid particles in the result of the flow simulation, where the higher the shear stress integral value, the higher the shear stress is received, and thus it can be regarded as a high level of exfoliation.

Referring to FIG. 9, it can be confirmed that the distribution of the shear stress integral value becomes narrower in Example (high-pressure homogenizer shown in FIG. 5) as compared with Comparative Example (high-pressure homogenizer shown in FIG. 6). That is, it can be confirmed that the difference in the shear stress received by the particles is reduced, and the graphene thickness becomes uniform.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, in the process of exfoliating a graphene monolayer from graphite using the high-pressure homogenizer, the exfoliation effective region in the microchannel can be increased to improve productivity.

The invention claimed is:

1. A high-pressure homogenizer comprising a channel module comprising a microchannel through which an object for homogenization passes,
wherein the microchannel is provided with a first channel to an Nth channel, wherein N is greater than 2, sequentially arranged along a direction through which the object passes,
the channel module comprises an inflow channel in which the object is supplied to the microchannel and an outflow channel to which the object passing through the microchannel is introduced,
the first channel is provided with a plurality of first baffles arranged so as to be partitioned into a plurality of spaces along a width direction or a height direction and sequentially, the Nth channel comprises a plurality of Nth baffles arranged so as to be partitioned into a plurality of spaces along a width direction or a height direction,
in two adjacent regions among N regions of the microchannel, baffles provided in respective regions are arranged in a staggered state for each region based on a flow cross section of the microchannel,
wherein the microchannel has a rectangular cross section perpendicular to the moving direction of the object for homogenization,
wherein the rectangular cross section of the microchannel is a rectangular shape having a width larger than a height, and
wherein the microchannel has a ratio of width to height of 2:1 to 10:1.

2. The high-pressure homogenizer according to claim 1, wherein the inflow channel is provided so that at least a part of a flow area becomes small along the moving direction of the object and the outflow channel is provided so that at least a part of the flow area increases along the moving direction of the object.

3. The high-pressure homogenizer according to claim 1, wherein an interval between two adjacent first baffles is equal to an interval between two adjacent Nth baffles.

4. The high-pressure homogenizer according to claim 1, wherein an interval between two adjacent first baffles is different from an interval between two adjacent Nth baffles.

5. The high-pressure homogenizer according to claim 1, wherein a length of the first baffle and a length of the Nth baffle are the same.

6. The high-pressure homogenizer according to claim 1, wherein a length of the first baffle and a length of the Nth baffle are different.

7. The high-pressure homogenizer according to claim 1, wherein the channel module is provided so that the object passes through respective spaces partitioned by the first and Nth baffles.

8. The high-pressure homogenizer according to claim 1, wherein the microchannel has a length of 2 mm to 1000 mm.

9. The high-pressure homogenizer according to claim 1, wherein the microchannel has constant flow areas of the first channel and the Nth channel along the moving direction of the object.

10. The high-pressure homogenizer according to claim 1, wherein the microchannel has a sectional area of $1.0 \times 10^2$ $\mu m^2$ ti $1.3 \times 10^8$ $\mu m^2$.

11. The high-pressure homogenizer according to claim 1, wherein the rectangular shape has a width of 10 μm to 50,000 μm.

12. The high-pressure homogenizer according to claim 1, wherein the rectangular shape has a breadth of 10 μm to 50,000 μm.

13. The high-pressure homogenizer according to claim 1, wherein the object is graphite.

* * * * *